Patented Aug. 31, 1926.

1,598,522

UNITED STATES PATENT OFFICE.

CLARENCE J. HERRLY, OF NIAGARA FALLS, NEW YORK, ASSIGNOR TO CARBIDE AND CARBON CHEMICALS CORPORATION, A CORPORATION OF NEW YORK.

PROCESS OF MAKING ALDOLS.

No Drawing. Application filed May 22, 1924. Serial No. 715,236.

This invention relates to improvements in the manufacture of condensation products of aliphatic aldehydes. The invention relates primarily to that type of reaction induced by caustic alkali and other substances acting upon aldehydes, and known as the aldol condensation. This, in the case of acetaldehyde, may be represented by the following equation, showing the formation of aldol (β-hydroxy butyraldehyde):

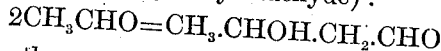

$2CH_3CHO = CH_3.CHOH.CH_2.CHO$

In the production of this substance, using caustic alkali as the condensing agent, it has heretofore been considered necessary to keep the reaction temperature below 20° C., to prevent too violent action. It is usual to specify temperatures between 0° C. and 10° C. Alkali in amount about 0.5% to 10% of the weight of the aldehyde is ordinarily used to bring about the condensation.

I have discovered that the reaction is more readily controlled and that better yields are obtained when the alkali concentration is relatively low and the temperature high, as compared with previous processes. In accordance with a preferred utilization of the invention, the free alkali is not in material excess of 0.1% and the temperature of the reaction mixture is allowed to rise to about 40°. or 50° C.

This procedure results in yields of aldol averaging 10 to 15% more than are ordinarily obtainable with the low temperature, high alkali processes.

In addition, the serious disadvantages of those processes are substantially avoided. Aside from the relatively low yield, the principal of these disadvantages are the slowness of the reaction, the tendency to resin formation, and the danger of a reaction of explosive violence in case the temperature control should fail. Temperature control is difficult when using a high percentage of alkali, on account of the great increase in the velocity of the reaction caused by slight rise of temperature. This difficulty is especially noticeable when working with large batches, and serious accidents are not unlikely if acetaldehyde containing a high percentage of alkali becomes overheated. To avoid this danger, addition of acid to the overheated batch has been suggested. This results in undesired condensations and makes the material substantially useless.

Also, a large proportion of alkali entails the formation of correspondingly large amounts of salts when the batch is neutralized after the reaction is complete. Such salts are troublesome to remove and may have a deleterious effect on the conversion of the aldol into the desired final product, for example crotonaldehyde.

The above-mentioned difficulties are avoided and positive advantages are obtained by the present process, of which the following example is illustrative:

Acetaldehyde is drawn into a closed vessel provided with an agitator and cooling coil. A dilute aqueous solution of a caustic alkali, preferably sodium hydroxid, is added in small portions to neutralize the ascertained acidity of the aldehyde. This acidity is due chiefly to oxidation by the air, and it is preferred to produce, keep, and use the aldehyde in an atmosphere of nitrogen, acetylene, or other suitable non-oxidizing gas.

During the neutralization the batch is preferably cooled to about 10° C. I have discovered that in the absence of such cooling the alkali intended for neutralization is likely to initiate aldol formation in limited portions of the batch, even though efficient stirring means be used. This results in irregularity of reaction which may be objectionable and justifies the preliminary cooling.

The cold, neutral aldehyde is next made faintly alkaline to phenolphthalein by addition of about 0.05% by weight of caustic alkali in dilute aqueous solution. The temperature is allowed to rise and the aldol condensation proceeds smoothly and at a rapid rate. When the temperature approaches 40° C. cold water or brine should be circulated through the cooling coil to hold the batch at about that point.

The period of reaction may be approximately nine hours. The batch is then cooled to around 20° C. and dilute sulfuric acid, equivalent to the total amount of alkali used, is added. If acetates will not be objectionable, the sulfuric acid need be equivalent only to the alkali added after the initial neutralization. Excess of acid results in the formation of higher condensation products, as described and claimed in my application Serial No. 422,819, filed February 5, 1921.

The unconverted acetaldehyde is distilled off under vacuum at a temperature below 50° C., to avoid the formation of crotonaldehyde. It is ordinarily unnecessary to remove the small amounts of salts formed in the neutralization of the alkali. A yield of aldol amounting to at least 83% of the original amount of acetaldehyde is ordinarily obtained. The acetaldehyde distilled off is returned to the process.

It will be understood that the preceding description is merely illustrative. Numerous modifications may be made. For example, I may use only 0.01% alkali as the condensing agent. With such low concentration a somewhat longer reaction period is desirable. The completion of the reaction may be ascertained by taking the specific gravity of the batch, or in other suitable ways. When the specific gravity is about 1.08 at 20° C. the maximum aldol condensation has usually been obtained.

I prefer aqueous caustic alkali, but solutions of such alkali in organic solvents, with or without water, or even solid alkalies, are not precluded. However, alcoholic solutions frequently cause the formation of acetals, which are objectionable and can not practically be removed. Solid alkalies tend to act on localized areas of the batch, even with efficient stirring.

The pressure prevailing in the closed reaction vessel is ordinarily about atmospheric. The reaction proceeds satisfactorily under this condition, but greater or less pressures may be used if desired. Variation in the pressure may necessitate a corresponding change in the temperature.

While reference has been made particularly to condensation of acetaldehyde, various other aliphatic aldehydes may be condensed in the manner described. Crotonaldehyde and butyraldehyde, for example, give excellent yields of the corresponding aldols.

I am aware that statements occur in the literature to the effect that aldol can not be produced by caustic alkali in amounts approximating 0.1% or less. My researches show that such statements are erroneous. The novel processes described herein have given highly satisfactory results in operations on a commercial scale.

I claim:

1. Process of making an aldol from an aliphatic aldehyde containing a plurality of carbon atoms in its molecule, comprising adding to the substantially neutral aldehyde between about 0.01% and 0.10% by weight of caustic alkali, and permitting a reaction temperature in material excess of 20° C. for a suitable period.

2. Process of preparing an aliphatic aldehyde for a condensation reaction, comprising neutralizing any acidity of the aldehyde while maintaining a temperature not materially in excess of 10° C., whereby premature condensation is prevented.

3. Process of making an aldol from an aliphatic aldehyde containing a plurality of carbon atoms in its molecule, comprising neutralizing any acidity of the aldehyde while maintaining a temperature not materially in excess of 10° C., adding to the substantially neutral aldehyde between about 0.01% and 0.10% by weight of caustic alkali, and permitting a reaction temperature in material excess of 20° C. for a suitable period.

4. Process of making an aldol from an aliphatic aldehyde containing a plurality of carbon atoms in its molecule, comprising adding to the substantially neutral aldehyde about 0.01% to 0.10% by weight of caustic alkali in dilute aqueous solution, and conducting the greater part of the condensation reaction at a temperature between 30° C. and 50° C.

5. Process of making an aldol from an aliphatic aldehyde containing a plurality of carbon atoms in its molecule, comprising adding to the substantially neutral aldehyde about 0.05% by weight of caustic alkali in dilute aqueous solution, and permitting the reaction to take place at a temperature of about 40° C.

6. Process of making aldol, comprising adding to acetaldehyde substantially free from uncombined acetic acid, about 0.01% to 0.10% by weight of caustic alkali in dilute aqueous solution, and permitting reaction to take place at a temperature materially in excess of 20° C. for a suitable period.

In testimony whereof, I affix my signature.

CLARENCE J. HERRLY.